US012300075B2

(12) United States Patent
Osborn et al.

(10) Patent No.: US 12,300,075 B2
(45) Date of Patent: May 13, 2025

(54) CONTACTLESS CARD PERSONAL IDENTIFICATION SYSTEM

(71) Applicant: Capital One Services, LLC, McLean, VA (US)

(72) Inventors: Kevin Osborn, Newton, MA (US); Srinivasa Chigurupati, Long Grove, IL (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/232,493

(22) Filed: Aug. 10, 2023

(65) Prior Publication Data

US 2024/0087394 A1    Mar. 14, 2024

Related U.S. Application Data

(63) Continuation of application No. 18/082,890, filed on Dec. 16, 2022, now Pat. No. 11,776,348, which is a continuation of application No. 17/377,189, filed on Jul. 15, 2021, now Pat. No. 11,557,164, which is a continuation of application No. 16/826,522, filed on Mar. 23, 2020, now Pat. No. 11,080,961, which is a continuation of application No. 16/725,133, filed on Dec. 23, 2019, now Pat. No. 10,657,754.

(51) Int. Cl.
*G07F 7/10* (2006.01)
*G06K 19/07* (2006.01)
*G06K 19/077* (2006.01)

(52) U.S. Cl.
CPC ....... *G07F 7/1008* (2013.01); *G06K 19/0723* (2013.01); *G06K 19/07749* (2013.01)

(58) Field of Classification Search
CPC ................ G07F 7/1008; G06K 19/07749
USPC ................................................. 235/380
See application file for complete search history.

(56) References Cited

U.S. PATENT DOCUMENTS

| 9,846,866 B2 | 12/2017 | Royyuru |
| 11,776,348 B2 * | 10/2023 | Osborn .................. G06F 21/34 235/380 |
| 2013/0144792 A1 | 6/2013 | Nilsson et al. |

(Continued)

FOREIGN PATENT DOCUMENTS

| CN | 101770619 A | 7/2010 |
| CN | 103516525 A | 1/2014 |

(Continued)

*Primary Examiner* — Ahshik Kim
(74) *Attorney, Agent, or Firm* — KDW Firm PLLC

(57) ABSTRACT

A dual-factor PIN based authentication system and method uses a cryptogram provided by a contactless card associated with the client in association with a PIN stored by the contactless card to authenticate the client. In some embodiments, cryptogram authentication may be preconditioned upon a PIN match determination by the contactless card. In other embodiments, the cryptogram may be formed at least in part using the personal identification number (PIN) stored on the contactless card encoded using a dynamic key stored by the contactless card and uniquely associated with the client. Authentication may be achieved by comparing the cryptogram formed using the PIN against an expected cryptogram generated an expected PIN and an expected dynamic key.

18 Claims, 14 Drawing Sheets

(56) References Cited

U.S. PATENT DOCUMENTS

| | | |
|---|---|---|
| 2013/0191290 A1 | 7/2013 | Glendenning |
| 2015/0134542 A1 | 5/2015 | Dykes |
| 2016/0127346 A1* | 5/2016 | Bares .................. H04L 63/0853 |
| | | 713/172 |
| 2016/0267262 A1* | 9/2016 | Taniguchi ............... G06F 21/32 |
| 2017/0017957 A1 | 1/2017 | Radu |
| 2019/0139029 A1 | 5/2019 | Kadiwala et al. |
| 2019/0213593 A1 | 7/2019 | Lewis et al. |

FOREIGN PATENT DOCUMENTS

| | | |
|---|---|---|
| JP | 2007249654 A | 9/2007 |
| JP | 2017524312 A | 8/2017 |
| JP | 2018147146 A | 9/2018 |
| KR | 1020160019653 A | 2/2016 |
| WO | 2018096559 A1 | 5/2018 |
| WO | 2018159024 A1 | 9/2018 |

* cited by examiner

CONTACTLESS CARD PERSONAL IDENTIFICATION SYSTEM

RELATED APPLICATIONS

This application is a continuation application of U.S. application Ser. No. 18/082,890, filed Dec. 16, 2022, which is a continuation application of U.S. patent application Ser. No. 17/377,189, filed Jul. 15, 2021, which is a continuation of U.S. patent application Ser. No. 16/826,522, filed Mar. 23, 2020, which is a continuation of U.S. patent application Ser. No. 16/725,133 (now U.S. Pat. No. 10,657,754), filed Dec. 23, 2019. The contents of the aforementioned applications are incorporated herein by reference in their entirety.

BACKGROUND

Credit card cloning, or "skimming", is a technique whereby a malicious actor copies credit card information from a credit card associated with an account onto a counterfeit card. Cloning is typically performed by sliding the credit card through a skimmer to extract ("skim") the credit card information from the magnetic strip of the card and storing the information onto the counterfeit card. The counterfeit card may then be used to incur charges to the account.

EMV (originally Europay, Mastercard, Visa) defines a standard for use of smart payment cards as well as terminals and automated teller machines that accept them.

EMV cards are smart cards (i.e., chip cards or IC (integrated circuit) cards) that include integrated circuits configured to store card information in addition to magnetic stripe information (for backward compatibility). EMV cards include both cards that are physically inserted (or "dipped") into a reader, as well as contactless cards that may be read over a short distance using near-field communication (NFC) technology.

Some EMV cards use Chip and PIN (personal identification number) technology to overcome the problems associated with cloning. For example, to authorize a transaction a user may enter a personal identification number (PIN) at a transaction terminal following a card swipe. A stored PIN, retrieved from the card by the transaction terminal, may be compared against the PIN input and the transaction may be approved only in the event of a match between the two. Such a solution may reduce fraudulent activity, but remains vulnerable to PIN theft caused by eavesdropping, man-in-the-middle or other type of attack.

SUMMARY

According to one aspect of the invention, a multi-factor authentication system, device and method combines a Personal Identification Number (PIN) validation procedure with a contactless card authentication process to reduce the potential for loss from card cloning.

According to one aspect, a method for dual factor authentication of a request for access to an account associated with a client includes the steps of: receiving an input pin from at a user interface; engaging a contactless card, the contactless card storing a pin associated with the client; forwarding the input pin to the contactless card; receiving, in response to a match of the input pin with the stored pin, a cryptogram from the contactless card, the cryptogram formed using a dynamic key of the contactless card, the dynamic key formed using a counter value maintained by the contactless card, where the cryptogram includes contactless card data that is encoded using the dynamic key; forwarding the cryptogram to an authenticating device; and authorizing the request in response to authentication of the cryptogram by the authenticating device.

According to another aspect, a method for dual factor authentication of a request for access to an account associated with a client includes the steps of: receiving an input pin from at a user interface. The method also includes engaging a contactless card, the contactless card storing a pin associated with the client. The method also includes receiving a cryptogram from the contactless card, the cryptogram formed using a dynamic key of the contactless card, the dynamic key formed using a counter maintained by the contactless card, where the cryptogram includes contactless card data including the pin and is encoded using the dynamic key. The method also includes forwarding the input pin and the cryptogram to an authenticating device, the request including a cryptogram. The method also includes authorizing the request in response to authentication of the input pin and cryptogram by the authenticating device.

According to a further aspect, a device includes a contactless card interface configured to communicate with a contactless card associated with a client, the contactless card including a stored pin, a user interface, a processor and a non-volatile memory having program code stored thereon for authenticating a request by the client. The program code operable when executed upon by the processor to forward an input pin received by the user interface to the contactless card and receive, in response to a match of the input pin with the stored pin, a cryptogram from the contactless card, the cryptogram formed using a dynamic key of the contactless card, the dynamic key formed using a counter value maintained by the contactless card, where the cryptogram includes contactless card data that is encoded using the dynamic key. The program code may further be operable to forward the cryptogram to an authenticating device and authorize the request in response to authentication of the cryptogram by the authenticating device.

DETAILED DESCRIPTION

Figure 1A:
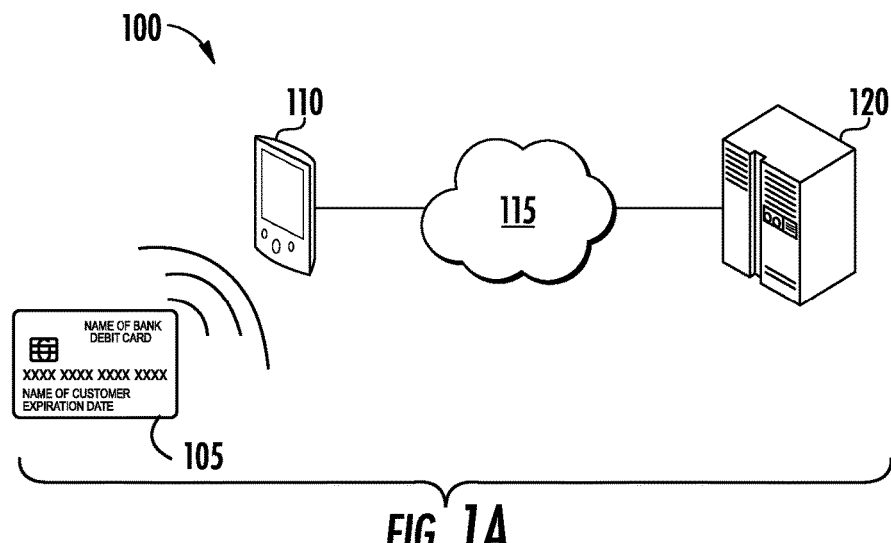
FIG. 1A is a block diagram of a data transmission system configured to provide multi-factor authentication of customer requests using personal identification numbers (PINs) according to an example embodiment.

Data security and transaction integrity are of critical importance to businesses and consumers. This need continues to grow as electronic transactions constitute an increasingly large share of commercial activity, and malicious actors become increasingly aggressive in efforts to breach transaction security.

Embodiments of the present disclosure provide a system, method and device for multi-factor authentication of transactions received at a client device using a Personal Identification Number (PIN) in conjunction with a contactless card.

The contactless card may include a substrate including a memory storing one or more applets, a counter value, and one or more keys. In some embodiments, the memory may further store a PIN which controls use of the contactless card as described herein. In one embodiment, the counter value may be used to generate a unique cryptogram that may be used to authenticate contactless card transactions. The cryptogram may be used together with the PIN to provide dual factor authentication of contactless card transactions.

The cryptogram may be formed as described in U.S. patent application Ser. No. 16/205,119 filed Nov. 29, 2018, by Osborn, et al., entitled "Systems and Methods for Cryptographic Authentication of Contactless Cards" and incorporated herein by reference (hereinafter the '119 application). In some embodiments, the cryptogram may formed from cryptographic hash of a shared secret, a plurality of keys and a counter value.

According to one aspect, the cryptogram may be used together with the PIN, to provide multifactor authentication of contactless card transactions. Multifactor authentication may involve validating a user's knowledge of a card PIN prior to, or as part of, authenticating a transaction using the cryptogram. In some embodiments, the cryptogram may be formed using the PIN. In some embodiments, the cryptogram may include an encoded PIN. In either case, transaction security is maintained because the PIN is never broadcast a discernible format and thus the potential for theft is reduced. Such an arrangement, which uses the PIN together with a cryptogram for dual factor authentication, protects against cloning of the contactless card by unauthorized third parties.

In some embodiments, PIN validation may be performed by the card as a precondition to cryptogram generation. In other embodiments, PIN validation may be performed by the transaction device or by a backend authentication server as part of cryptogram authentication. Each of these methods is described in greater detail below.

It is appreciated that in various systems that include clients, client devices and authentication servers, the functions of PIN storage, in various embodiments encryption and authentication may be performed by different components. In some embodiments, a copy of the PIN may be maintained in a memory of the contactless card. In such an embodiment, the PIN copy may be used to validate a user of a contactless card as part of a cryptogram authentication process. In some embodiments, the PIN may be used to generate a digital signature or cryptogram. In some embodiments, cryptogram authentication may be performed by a transaction device, an authentication server, or some combination thereof.

The present system thus provides dual-factor authentication that establishes both knowledge (i.e., PIN number), and possession (i.e., the contactless card and dynamic key), reducing the ability of malicious actors to successfully clone the contactless card.

These and other features of the invention will now be described with reference to the figures, wherein like reference numerals are used to refer to like elements throughout. With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process may be here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose, or it may comprise a general-purpose computer as selectively activated or reconfigured by a computer program stored in the computer. The processes presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments may be practiced without these specific details. In other instances, well-known structures and devices are shown in block diagram form to facilitate a description thereof. The intention is to cover all modifications, equivalents, and alternatives consistent with the claimed subject matter.

FIG. 1A illustrates a data transmission system according to an example embodiment. As further discussed below, system 100 may include contactless card 105, client device 110, network 115, and server 120. Although FIG. 1A illustrates single instances of the components, system 100 may include any number of components.

System 100 may include one or more contactless cards 105. In one embodiment, a contactless card 105 comprises a card of credit-card dimension including an embedded integrated circuit, a storage device and an interface that permits the card to communicate with a transmitting device using a Near Field Communication (NFC) protocol. A contactless card that may be used herein includes that described in the '119 application, for example.

System 100 may include client device 110, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 110 may include a processor and a memory, and it is understood that the processing circuitry may contain additional components, including processors, memories, error and parity/CRC checkers, data encoders, anti-collision algorithms, controllers, command decoders, security primitives and tamper proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that may be available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 to transmit and/or receive data.

Client device 110 may be in communication with one or more servers 120 via one or more networks 115 and may operate as a respective front-end to back-end pair with server 120. Client device 110 may transmit, for example from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to the client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one client device 110. In some embodiments, the server 120 may be an authentication server configured to perform cryptogram authentication as disclosed herein.

Figure 1B:
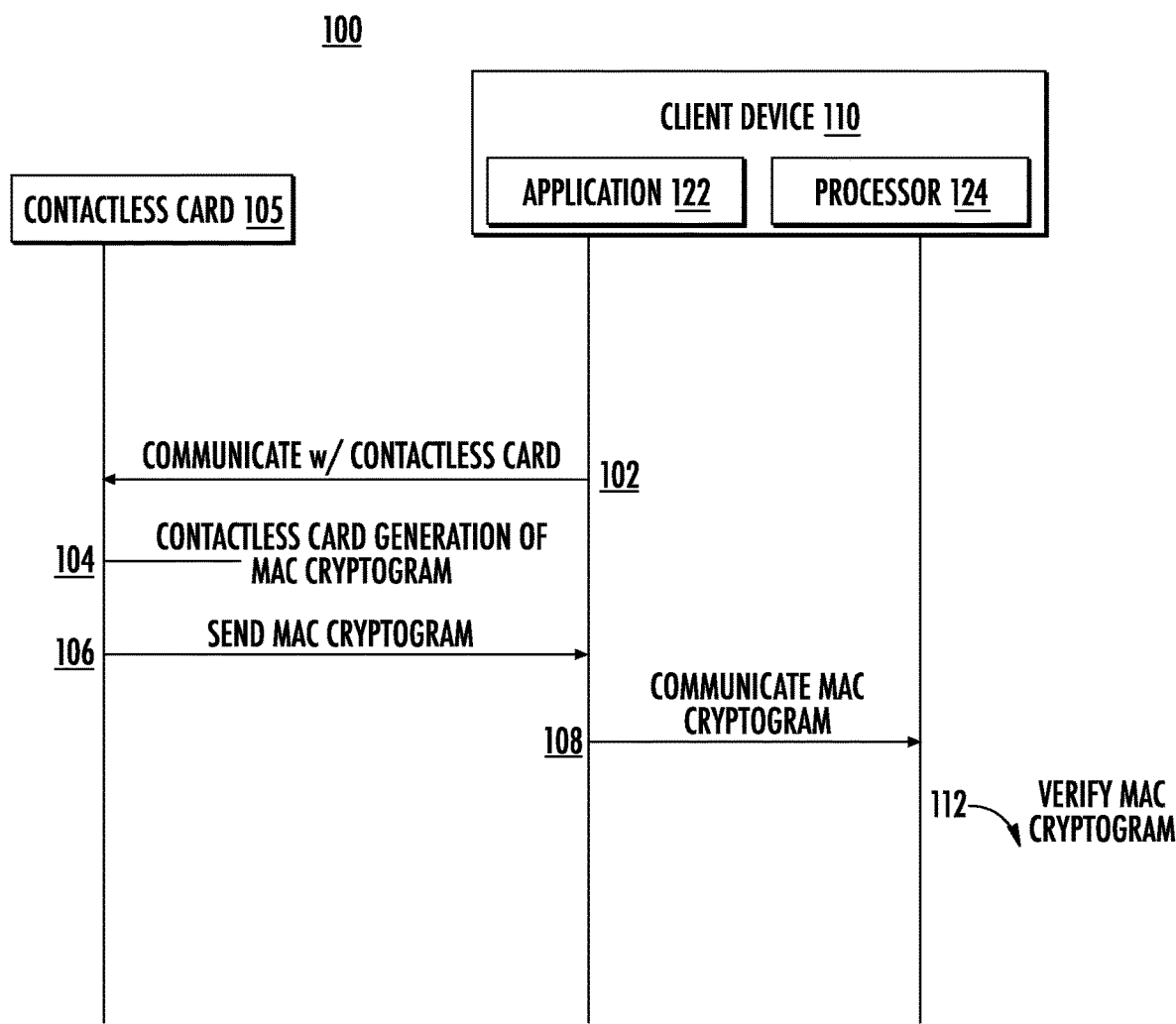
FIG. 1B is a data flow diagram illustrating one embodiment of a sequence for providing authenticated access using data stored on a contactless card.

FIG. 1B is a timing diagram illustrating an exemplary sequence for authenticating contactless card transactions according to one or more embodiments of the present disclosure. In particular, FIG. 1B describes an exemplary process for exchanging authentication data, including a cryptogram, between a contactless card 105 and a client device 110. System 100 may comprise contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format. For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 105 may be updated or incremented, which may be followed by "Read NDEF file." At this point, the message may be generated which may include a header and a shared secret.

Session keys may then be generated. In one embodiment, a diversified key may be generated using by using a cryptographic hash to combine a master symmetric key with a dynamic counter value maintained by the contactless card. Examples of cryptographic hash algorithms that may be used include symmetric encryption algorithms, the HMAC algorithm, and a CMAC algorithm. Non-limiting examples of the symmetric algorithms that may be used to encrypt the username and/or cryptogram may include a symmetric encryption algorithm such as 3DES (Triple Data Encryption Algorithm) or Advanced Encryption Standard (AES) 128; a symmetric Hash-Based Message Authentication (HMAC) algorithm, such as HMAC-SHA-256; and a symmetric cypher-based message authentication code (CMAC) algorithm such as AES-CMAC. It is understood that numerous forms of encryption are known to those of skill in the art, and the present disclosure is not limited to those specifically identified herein.

The MAC cryptogram may be created from the message, which may include the header and the shared secret. In some embodiments, shared information, including, but not limited to a shared secret and/or a PIN, may then be concatenated with one or more blocks of random data and encoded using a cryptographic algorithm and the diversified key to generate a MAC cryptogram. Thereafter, the MAC cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124.

At step 112, the processor 124 verifies the MAC cryptogram pursuant to an instruction from the application 122. For example, the MAC cryptogram may be verified by an authorization server, such as server 120 of FIG. 1A. The authorization server may store, for each client device 110, a copy of the counter, shared secret and keys of the client device. In some embodiments, as described in more detail below, the authorization server may also store a PIN associated with the client device. The authorization server may update the counter for each contactless card transaction according to a protocol established between the client device 110 and the authorization server such that the counters remain synchronized. The authorization server may use its copy of the counter, keys, shared secret and/or PIN to construct an expected MAC cryptogram.

In some examples, the MAC cryptogram may function as a digital signature for purposes of verification. Other digital signature algorithms, such as public key asymmetric algorithms, e.g., the Digital Signature Algorithm, the RSA algorithm, or zero knowledge protocols, may be used to perform this verification.

The authorization server may compare the MAC cryptogram received from the contactless card to the expected MAC cryptogram generated by the authorization server. Such an arrangement improves transaction security in a variety of manners. First, the dynamic nature of the cryptogram resulting from its construction using variable counter values that are periodically updated according to a protocol established between the client and server reduces the ability of a malicious third party to re-use authentication information. Second, the use of cryptographic algorithms further protects sensitive information from discovery via eavesdropping. Third, incorporating PIN code validation together with cryptogram authentication adds a knowledge qualifier for dual-factor authentication.

Figure 2A:
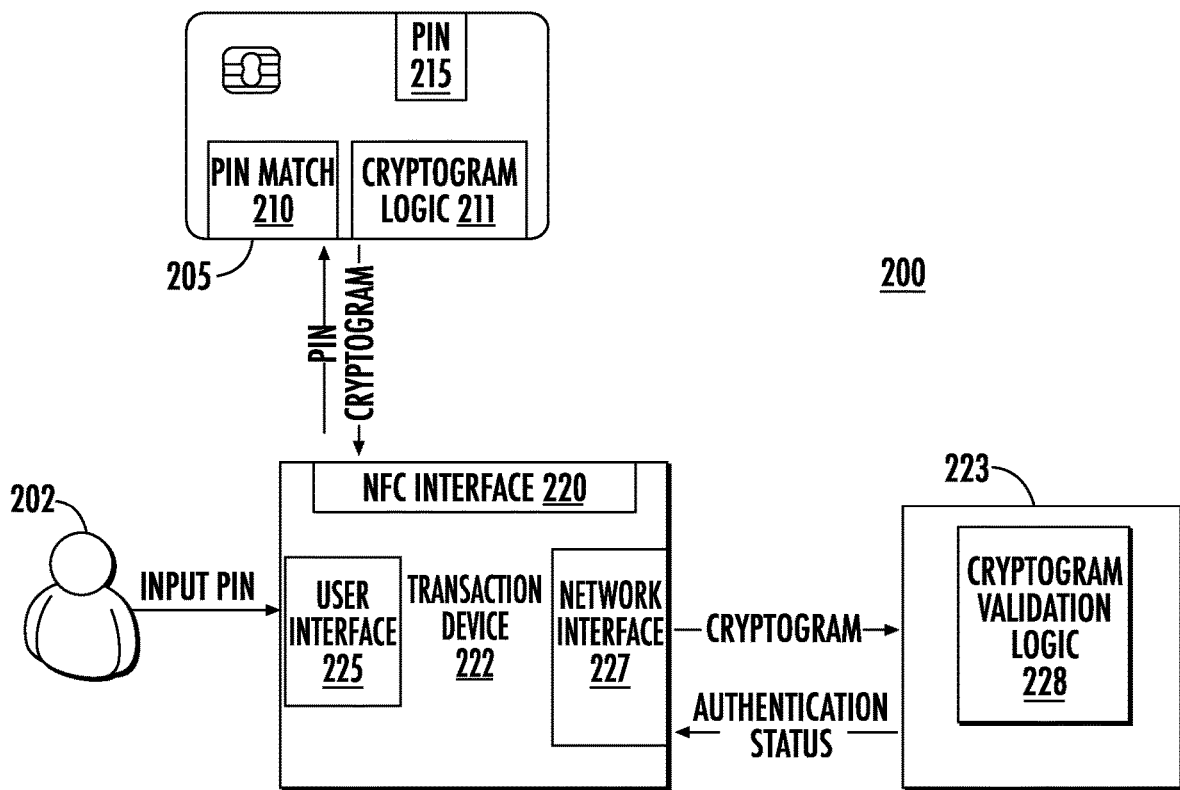
FIGS. 2A and 2B illustrate one embodiment of a system and method for dual-factor PIN based authentication as disclosed herein.
Figure 2B:
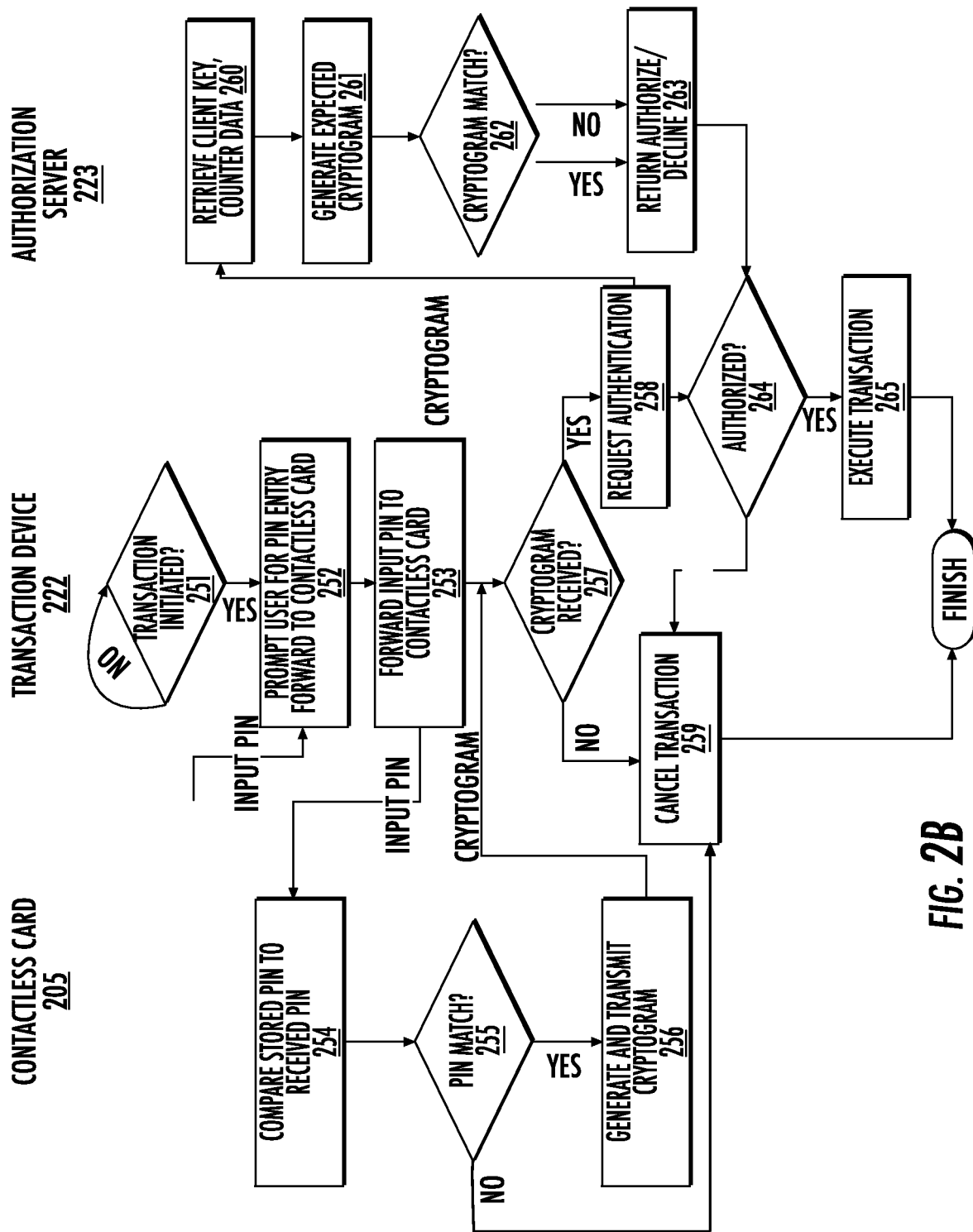

FIGS. 2A and 2B illustrate a respective system and process of one embodiment of a dual factor authentication system configured to support authentication methods using a PIN together with and/or as part of a cryptogram.

In the system 200 of FIG. 2A, the transaction device 222 (which may be a client mobile device, a merchant transaction device or any device comprising NFC communication capability) is shown to include a user interface 225 for receiving information, such as an input PIN, from a user 202. The transaction device 222 also is shown to include an NFC interface 220 configured to support NFC communications with contactless card 205 and a Network Interface 227 configured to support network communications, including but not limited to internet protocol (IP) communications with an authentication server 223.

According to one aspect, the contactless card 205 comprises PIN match logic 210, which may include hardware, software or a combination thereof configured to compare a PIN, stored in contactless card memory, to a PIN received from the transaction device 222, for example as part of an NDEF record. The card 205 also includes cryptogram generation logic 211, configured to generate a cryptogram, for example as disclosed in the '119 application.

The cryptogram logic 211 may comprise a combination of hardware and software components, including but not limited to a storage device configure to store one or more keys and a counter value for the card 205. The contactless card may further include counters, encryption and/or hashing hardware and software, etc., for use in generating a diversified, dynamic key for use in encoding messages from the contactless card. In some embodiments, the cryptogram logic 211 may be implemented at least in part as an applet stored in a memory of the contactless card 205. Although the PIN logic 210 and cryptogram logic 211 are shown separately delineated it is appreciated that the functionality may be differently apportioned in various embodiments. For example, in some embodiments PIN logic 210 and cryptogram logic 211 may be implemented by a single applet.

The server 223 is shown to include cryptogram validation logic 228. The cryptogram validation logic 228 may comprise a combination of hardware and software components, including but not limited to storage devices storing client keys and counter values, counters, encryption and/or hashing hardware and software, etc. In one embodiment, cryptogram validation logic 228 may be configured to generate diversified, dynamic keys for use in generating an expected cryptogram, and the validation logic may compare the expected cryptogram to a received cryptogram from the client device. Matching cryptograms indicate a coordination between the counters of the client device and the authentication server. In addition, matching cryptograms may also indicate knowledge of information such as shared secrets, PINs and the like.

FIG. 2B illustrates a method for dual factor authentication using the system of FIG. 2A. At step 251 a transaction is initiated by user 202; for example, the user may seek to access an account, make a purchase, or otherwise perform an action that benefits from the dual factor authentication method disclosed herein. At step 252, the user 202 is prompted to input a PIN and upon receipt of the input PIN, the transaction device 222 may initiate a dual-authentication cryptogram exchange with the contactless card 205, for example by prompting the user to tap the card 205 on the transaction device 222 or otherwise bring the contactless card 205 in communication range with the transaction device 222.

When the contactless card is within range of the transaction device, at step 253 the transaction device 222 forwards the input PIN to the contactless card 205, for example as a PIN record, and issues a read of an NFC tag associated with a cryptogram generating applet. At step 254, PIN match logic 210 may compare the input PIN against the stored PIN 215. If a 'match' is determined at step 255, the cryptogram generating applet is instructed to generate a cryptogram at step 256 an to transmit the cryptogram back to the transaction device 222.

If, at step 257 a cryptogram is not received, for example due to a PIN mismatch, at step 259 the transaction may be cancelled. If a cryptogram is received at step 257, then at step 258 the transaction device 222 requests authentication of the transaction, forwarding the cryptogram to the authentication server 223.

At step 260, upon receipt of the cryptogram by the authentication server 223, the authentication server retrieves client data, including counters, keys, shared secrets and the like that are associated with the contactless card 205. Using this information, at step 261 the authentication server generates an expected cryptogram, and at step 262 determines whether the generated cryptogram corresponds to the unique digital signature provided by the received cryptogram. At step 263, the authentication server returns an authorize/decline response to the transaction device 222. If the transaction device 222 determines at step 264 that the transaction is authorized, then the transaction may be executed at step 265. If the transaction is declined, the transaction device cancels the transaction at step 250.

The disclosed dual-factor PIN based authentication system improves upon transaction security by protecting the stored PIN 215 from discovery; as discussed, the stored PIN is not publicly transmitted and thus cannot be obtained by malicious monitoring during a PIN exchange. In the event that a PIN, shared secret and/or counter value may be obtained via skimming, a cloned card without knowledge of the dynamic counter protocol implemented between the card and the authentication server would be inoperable.

Figure 3A:
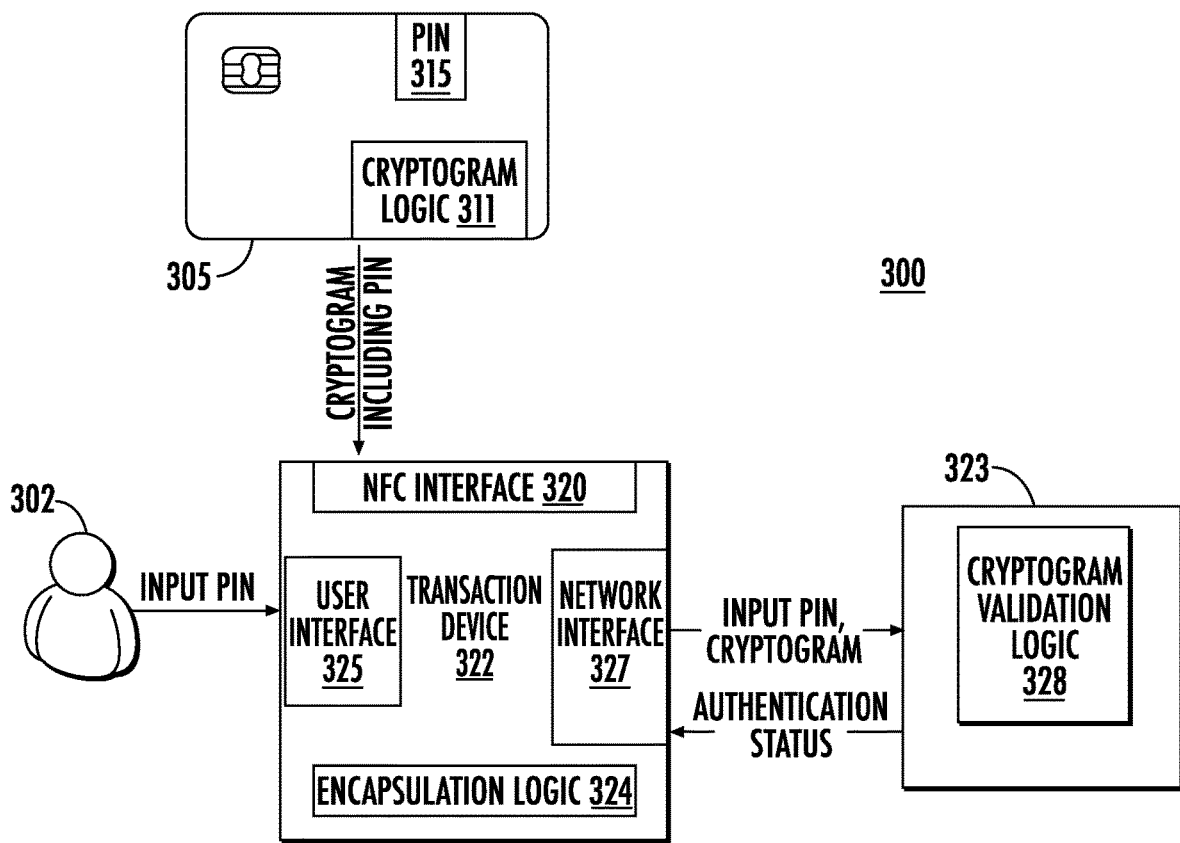
FIGS. 3A and 3B illustrate an alternate embodiment of a system and method for dual-factor PIN based authentication as disclosed herein.
Figure 3B:
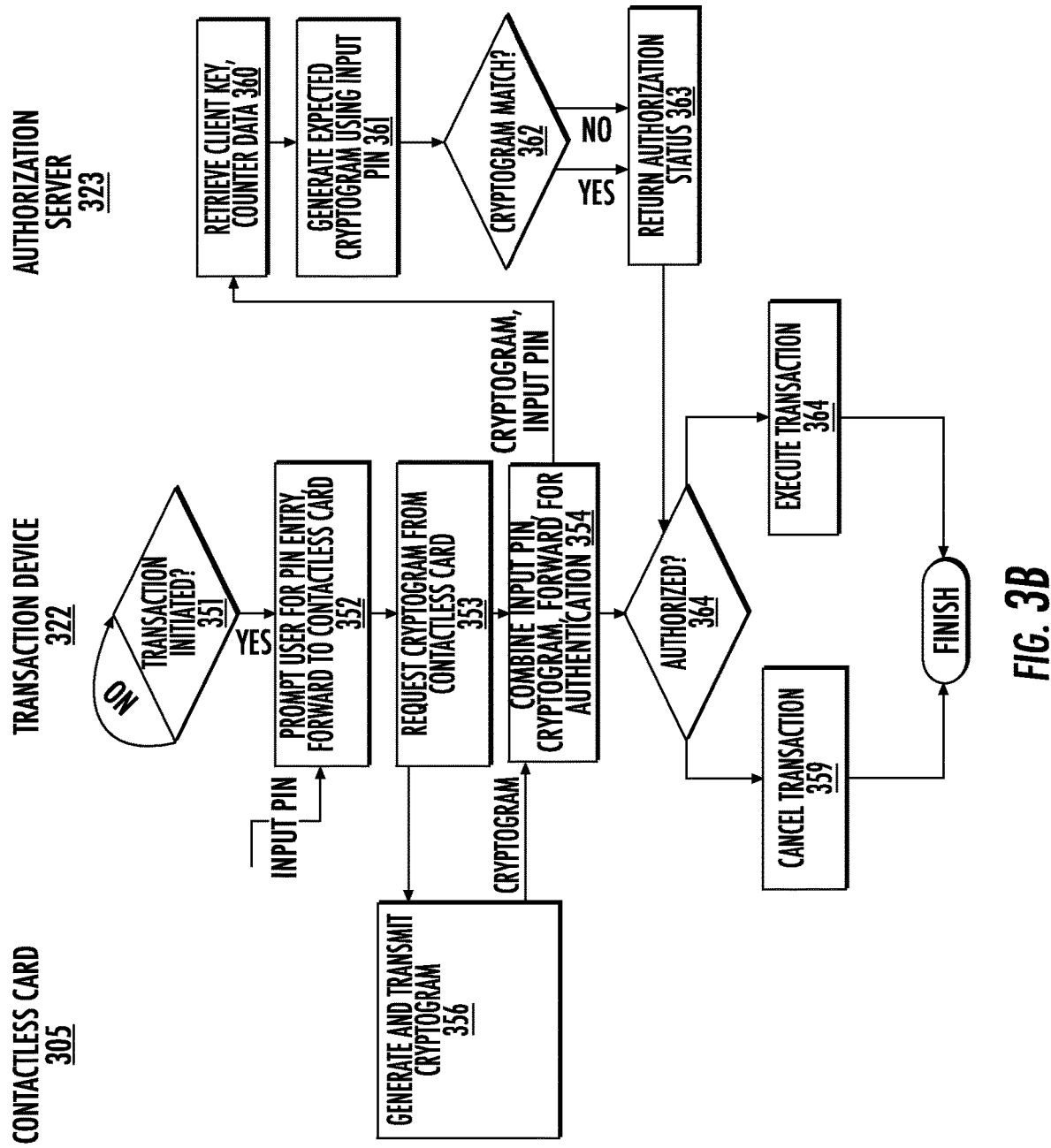

FIGS. 3A and 3B disclose another embodiment of a dual-factor pin based authorization system and method, where PIN Match functionality may be provided as part of cryptogram validation logic 328 by the authentication server 323. In the system 300 of FIG. 3A, the card 305 stores the unique PIN 315 for the contactless card and comprises cryptogram logic 311, which, as described above, may comprise a cryptogram generating applet. According to one embodiment and described in more detail below, the cryptogram provided by the contactless card 305 may include and/or be formed using the PIN 315.

Transaction device 322 includes a user interface 325, an NFC interface 320 and a network interface 327. In addition, the transaction device may include encapsulation logic 324 which may in one embodiment comprise code for encrypting the input PIN and/or cryptogram prior to forwarding the input PIN/cryptogram pair to the authentication server 323.

The authentication server 323 includes cryptogram validation logic 328, which may operate to extract the input PIN from the encrypted input PIN/cryptogram pair. The cryptogram validation logic 328 may be further configured to generate an expected cryptogram using the input PIN and stored client data, such as counter and key data. The cryptogram validation logic 328 may then compare the expected cryptogram against the extracted cryptogram to determine a match, indicating correlation between the input PIN and stored PIN, as well as counter and key information.

FIG. 3B is a flow diagram of a dual factor authentication process that may be performed by system 300. After a transaction is initiated at step 351, at step 352 the user 302 is prompted for an input PIN. At step 353, a cryptogram authentication process is initiated as described above, for example the transaction device 322 may issue an NFC read operation to an NDEF tag producing applet of the card 305, in particular an NDEF tag producing applet configured to retrieve the PIN 315 from the contactless card 305 for inclusion in the cryptogram payload. At step 356 the applet of the contactless card may assemble cryptogram data in the form of <UserID><Counter><MAC of UserID+Counter+PIN). In some embodiments, a diversified key, formed using the counter, may be used to encode the <MAC of UserID+Counter+PIN> using a cryptographic hashing algorithm or the like. Public key asymmetric algorithms, e.g., the Digital Signature Algorithm and the RSA algorithm, or zero knowledge protocols, may be used to perform this verification may alternatively be used.

The contactless card 305 returns the cryptogram to the transaction device 322, and at step 354 the transaction device 322 combines the input PIN with the received cryptogram. In some embodiments, the input PIN and/or the received cryptogram may be encrypted to obfuscate the input PIN information, for example using symmetric encryption algorithms. The combination is forwarded to the authentication server 323.

At step 360, the authentication server 323 retrieves authentication information (including a counter value, keys, shared secret or the like) related to the contactless card from storage. Using this information, at step 361 the authentication server may assemble an expected cryptogram, for example in the form of <MAC of UserID+stored Counter+input PIN>. At step 362, the authentication server determines whether there is a match of between the expected cryptogram and the cryptogram retrieved from the contactless card and returns the authorization status to the transaction device 322 at step 363. In response to receipt of the authorization status at step 364, if the transaction either proceeds at step 364 or is cancelled at step 359.

Accordingly, in the embodiment of FIGS. 3A and 3B, although cryptogram generated by the contactless card is formed using the PIN, the PIN itself is not transmitted in a discernible or derivable form over the network.

Figure 4A:
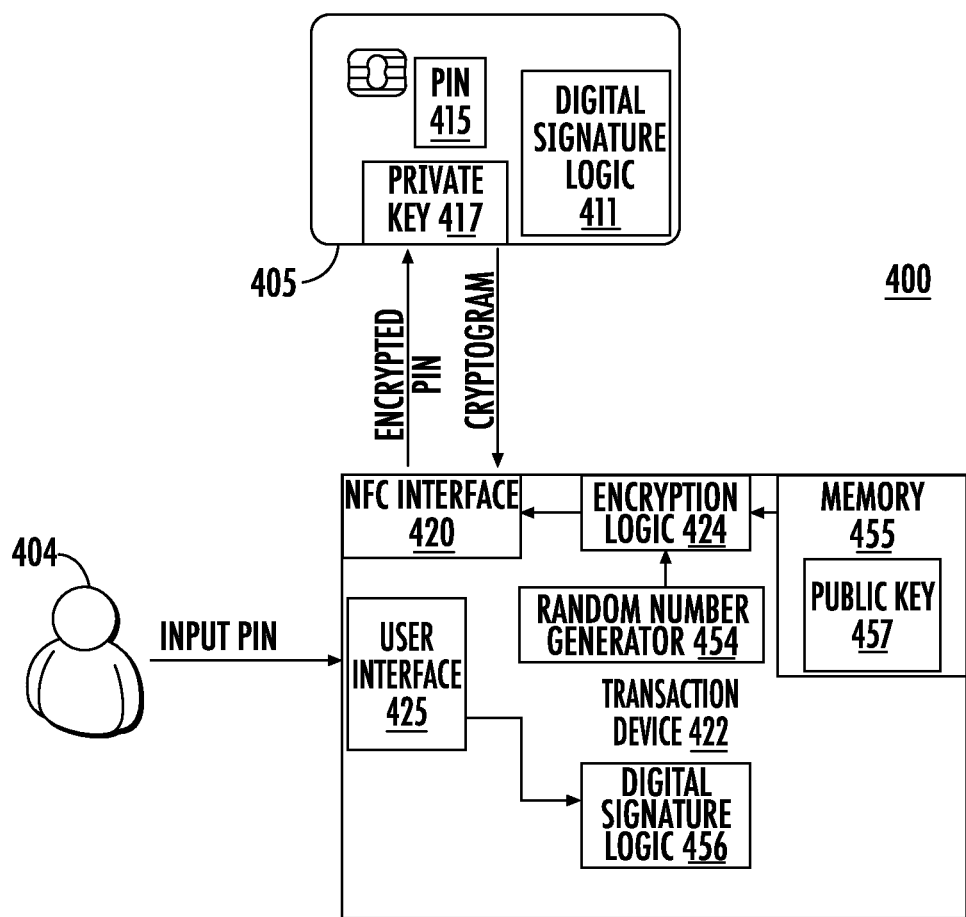
FIGS. 4A and 4B illustrate an alternate embodiment of a system and method for dual-factor PIN based
Figure 4B:
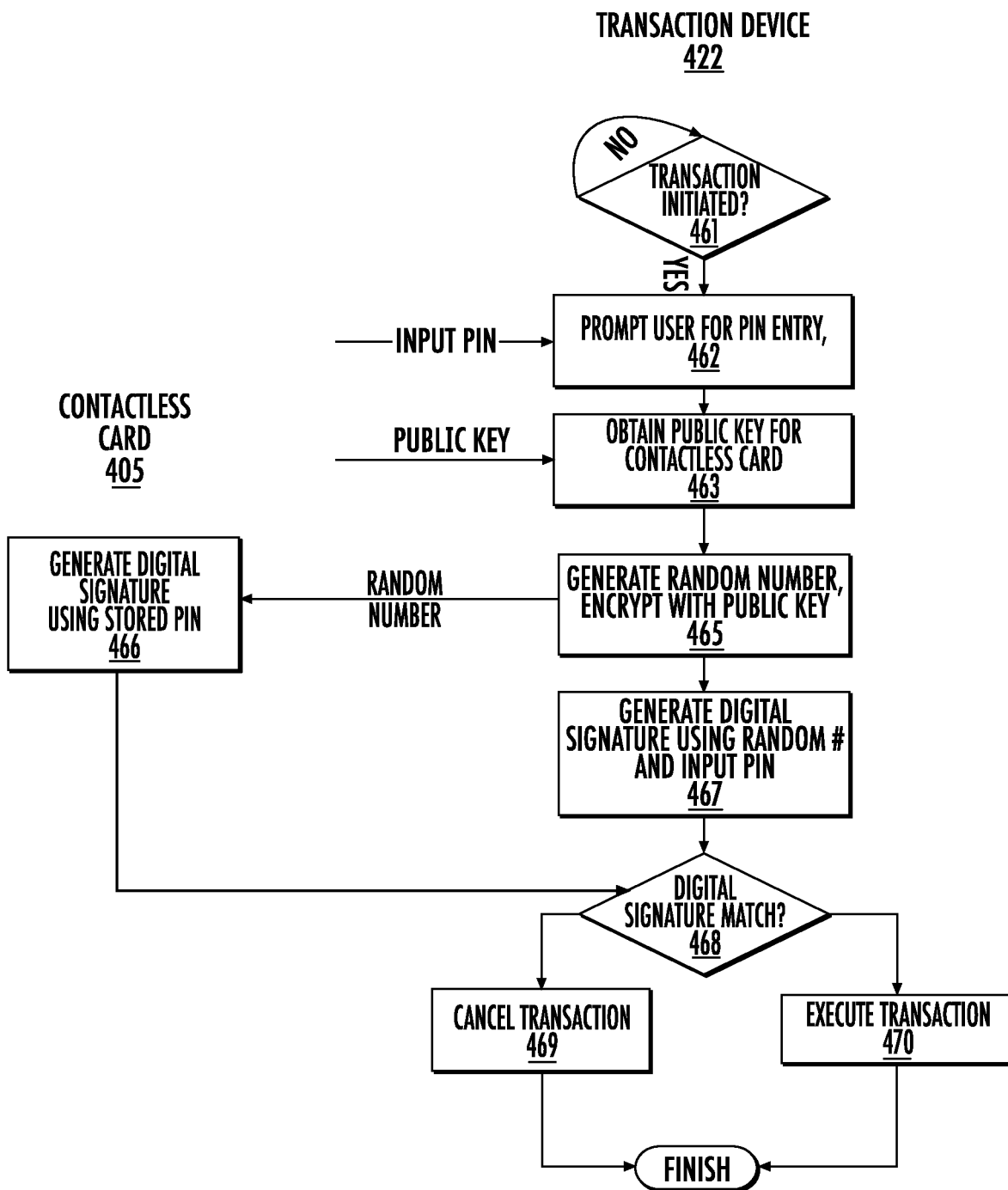

FIGS. 4A and 4B disclose another embodiment of a dual-factor pin based authorization system and method, where PIN match may be performed by the transaction device using public key cryptography. In one embodiment, the contactless card 405 maintains a private key 417. The private key 417 is known only to the contactless card 405 and may be used to decrypt communications encrypted via the public key. The contactless card may further include digital signature logic 411 configured to generate a unique digital signature, cryptographic hash to provide the cryptogram for communication to the transaction device 422.

The transaction device 422 includes a user interface 425 and an NFC interface 420. The transaction device is shown to further include a random number generator 454, encryption logic 424 and a memory storing 455 storing a public key 457 associated with the contactless card, where the public key may be retrieved by the transaction device from a trusted, certified authority. The transaction device further includes digital signature logic 456 for generating a digital signature as described below. In some embodiments, the public key of the card 405 may be stored by the card 405 and read by the transaction device as part of the authentication process.

A method for dual-factor authentication using the system 400 of FIG. 4A is shown in FIG. 4B. When it is determined at step 461 that a transaction has been initiated, at step 462 the user 404 is prompted to enter an input PIN. At step 463 the transaction device obtains the public key associated with the contactless card, either from the card itself, or from a trusted certification authority. At step 465, the transaction device generates a random number which it encrypts with the public key and forwards to the contactless card 405. At step 466, the contactless card decrypts the random number using its private key, and generates a digital signature using a combination of the random number and the stored PIN 415. The resulting digital signature is forwarded back to the transaction device 422.

At step 467 the transaction device 422 also generates a digital signature, using the random number in conjunction with the input PIN received from the user 402. At step 468 the digital signatures are compared to identify a match. Depending upon the match status, the transaction is either executed at step 470 (match) or canceled at step 469 (mismatch).

Figure 5A:
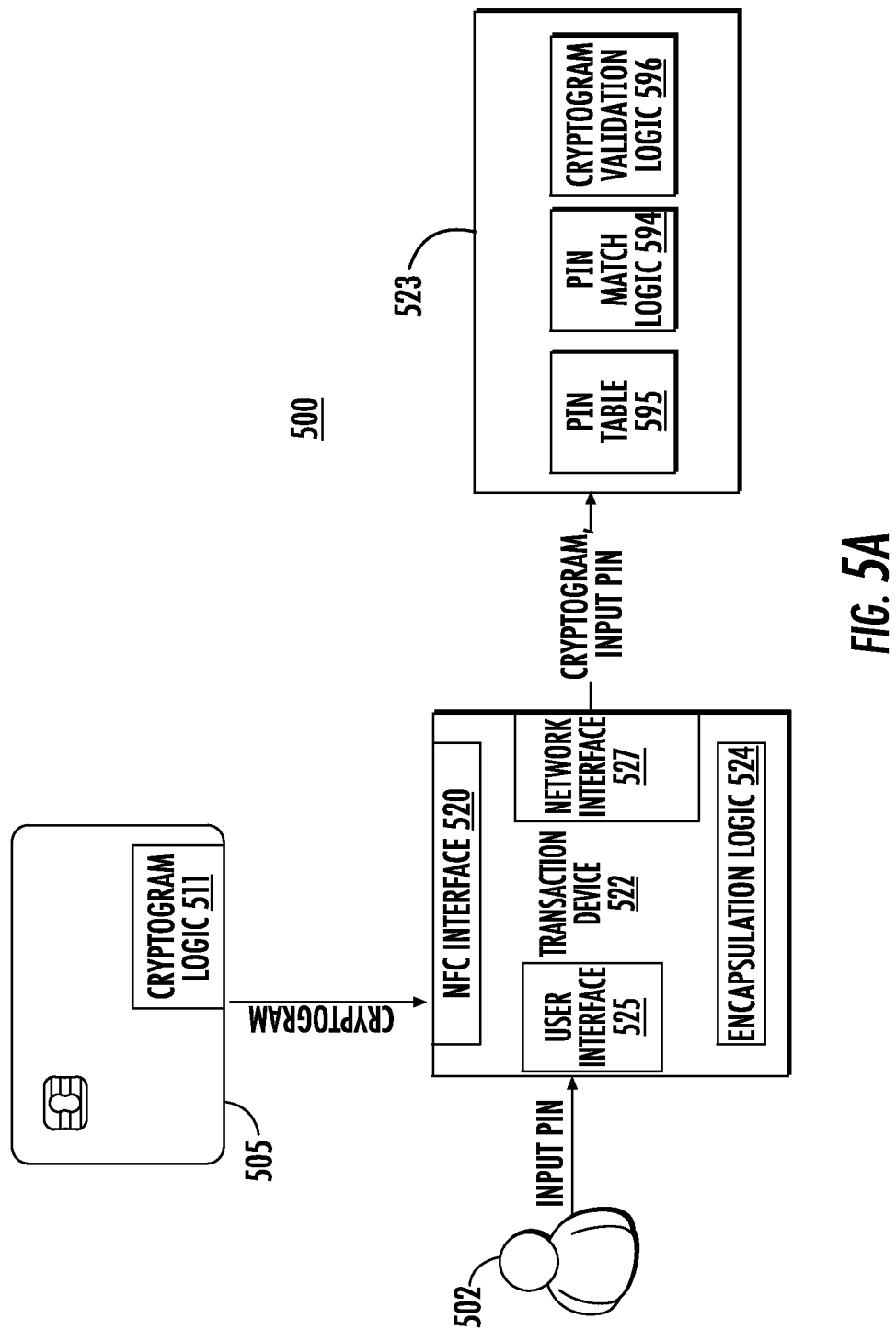
FIGS. 5A and 5B illustrate an alternate embodiment of a system and method for dual-factor PIN based authentication as disclosed herein.
Figure 5B:
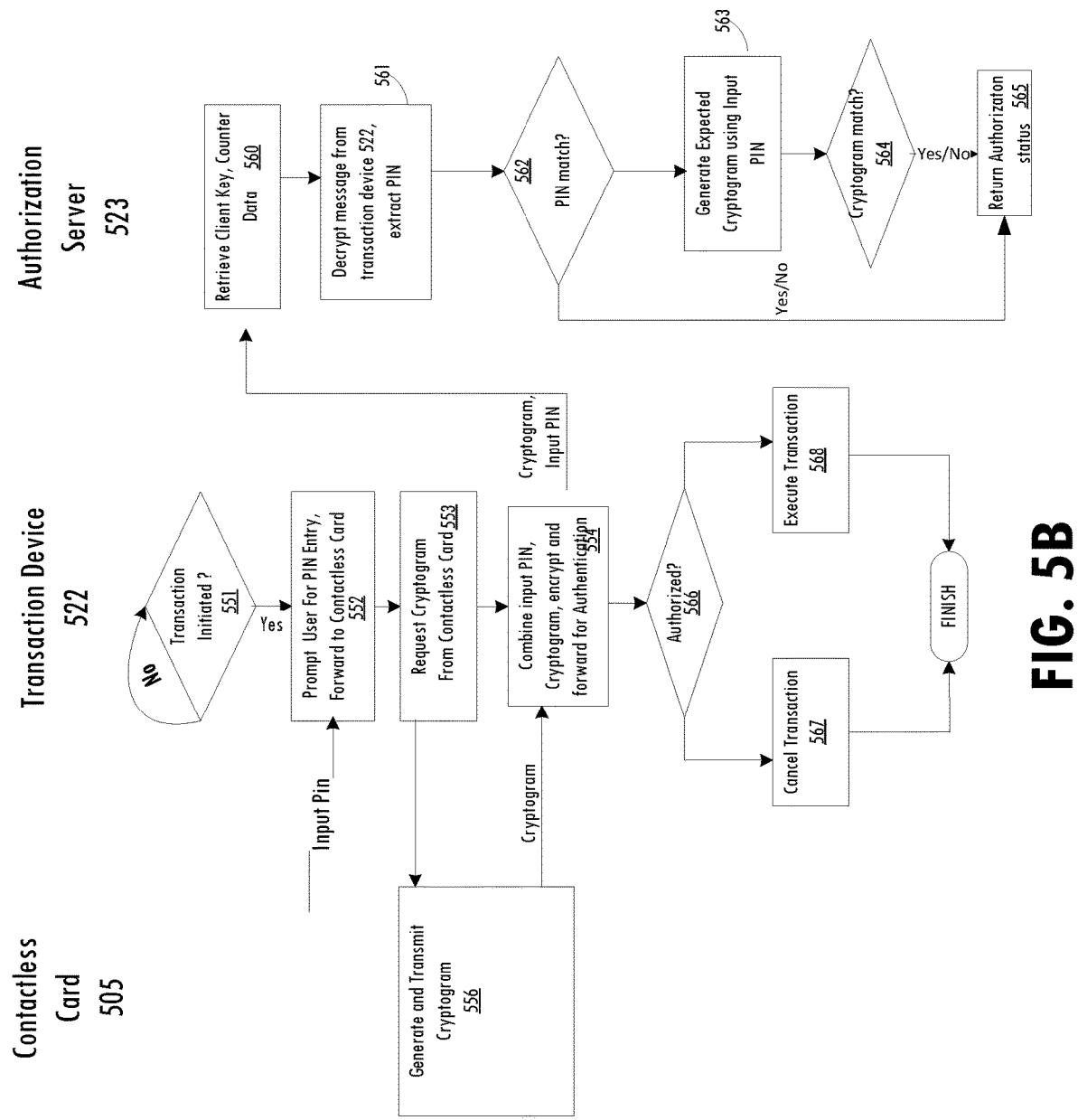

FIGS. 5A and 5B disclose another embodiment of a dual-factor pin based authorization system and method, where contactless card PINs are stored at the authentication server and used in conjunction with the cryptograms to authenticate transactions. In the system 500 of FIG. 5A, the contactless card 505 includes cryptogram logic 511 for generated a cryptogram using a combination of counters, dynamic keys, shared secrets and the like as described above. The transaction device 522 includes a user interface 520, an NFC interface 525 and a network interface 527. In addition, the transaction device may include encapsulation logic 524 which may in one embodiment comprise code for encrypting the input PIN and/or cryptogram prior to forwarding the input PIN/cryptogram pair to the authentication server 523. The authentication server 523 includes a PIN table 595, PIN Match logic 594 and cryptogram validation logic 596.

A method for dual-factor authentication using the system 500 of FIG. 5A is shown in FIG. 5B. Following imitation of a transaction at step 551, at step 552 the user 502 is prompted for an input PIN, and at step 553 the transaction device 522 requests a cryptogram from the contactless card 505. At step 555 the contactless card generates a cryptogram and returns it to the transaction device 5422. At step 554, the transaction device combines the input PIN, received from the user, with the cryptogram from the contactless card, encrypts it and forwards it to the authentication server 523. At step 560, the authorization server retrieves a PIN, counter and keys associated with the contactless card 505. At step 561 the authorization server decrypts the message from the transaction device 522, extracts the input PIN and at step 562 compares the extracted input PIN to the expected input PIN retrieved from the PIN table. At step 563, the authentication server 523 may also extract the cryptogram, retrieved from contactless card 505. The authentication server 523 may construct an expected cryptogram using stored key, counter and shared secret information stored by the cryptogram validation logic. At step 564, the transaction device may compare the expected cryptogram to the extracted cryptogram to determine a match. In response to the comparisons, the authentication server 523 returns authorization status to the transaction device at step 565. In response to receipt of the authorization status at step 566, the transaction is either executed at step 568 (match) or canceled at step 567 (mismatch).

Accordingly, various systems and methods for providing dual-factor pin based authentication have been shown and described. Exemplary components that may be included in a contactless card, transaction device and or authorization server, together with and/or in place of components already described, to support the described methods will now be described with regard to FIGS. 6-10.

Figure 6:
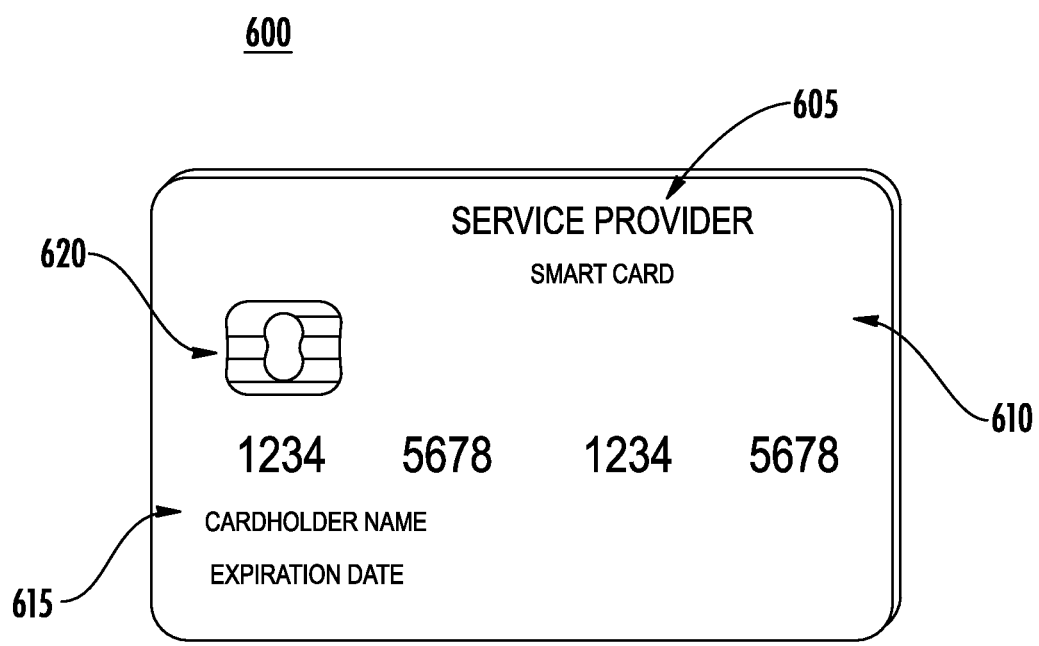
FIG. 6 is an example of a contactless card for storing authentication information that may be used in the system of FIG. 1A.

FIG. 6 illustrates a contactless card 600, which may comprise a payment card, such as a credit card, debit card, or gift card, issued by a service provider 605 whose identity may be displayed on the front or back of the card 600. In some examples, the contactless card 600 is not related to a payment card and may comprise, without limitation, an identification card. In some examples, the payment card may comprise a dual interface contactless payment card. The contactless card 600 may comprise a substrate 610, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 600 may have physical characteristics compliant with the ID-1 format of the ISO/IEC 7810 standard, and the contactless card may otherwise be compliant with the ISO/IEC 14443 standard. However, it is understood that the contactless card 600 according to the present disclosure may have different characteristics, and the present disclosure does not require a contactless card to be implemented in a payment card.

The contactless card 600 may also include identification information 615 displayed on the front and/or back of the card, and a contact pad 620. The contact pad 620 may be configured to establish contact with another communication device, such as a user device, smart phone, laptop, desktop, or tablet computer. The contactless card 600 may also include processing circuitry, antenna and other components not shown in FIG. 6. These components may be located behind the contact pad 620 or elsewhere on the substrate 610. The contactless card 600 may also include a magnetic strip or tape, which may be located on the back of the card (not shown in FIG. 6).

Figure 7:
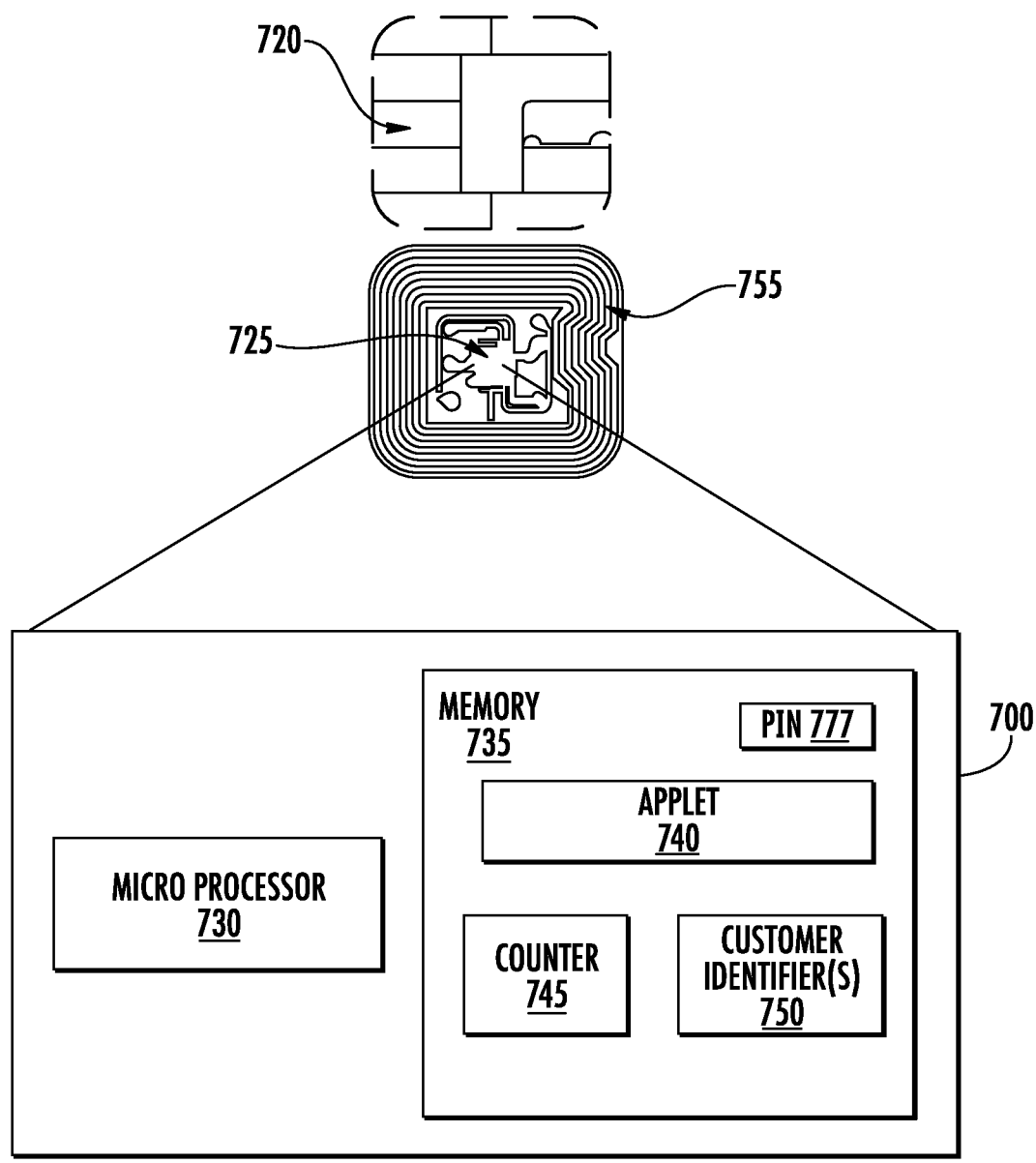
FIG. 7 is a block diagram illustrating exemplary components that may be included in the contactless card of FIG. 3.

As illustrated in FIG. 7, the contact pad 720 may include processing circuitry for storing and processing information, including a microprocessor 730 and a memory 735. It is understood that the processing circuitry may contain additional components, including processors, memories, error and parity/CRC checkers, data encoders, anti-collision algorithms, controllers, command decoders, security primitives, and tamper-proofing hardware, as necessary to perform the functions described herein.

The memory 735 may be a read-only memory, write-once read-multiple memory or read/write memory, e.g., RAM, ROM, and EEPROM, and the contactless card 700 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times.

The memory 735 may be configured to store one or more applets 740, one or more counters 745, and a customer information 750. According to one aspect, the memory 735 may also store PIN 777.

The one or more applets 740 may comprise one or more software applications associated with a respective one or more service provider applications and configured to execute on one or more contactless cards, such as a Java Card applet. For example, the applet may include logic configured to generate a MAC cryptogram as described above, including, in some embodiments, a MAC cryptogram that is formed at least in part using PIN information.

The one or more counters 745 may comprise a numeric counter sufficient to store an integer. The customer information 750 may comprise a unique alphanumeric identifier assigned to a user of the contactless card 700 and/or one or more keys that together may be used to distinguish the user of the contactless card from other contactless card users. In some examples, the customer information 750 may include information identifying both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 720 or entirely separate from it, or as further elements in addition to the microprocessor 730 and the memory 735 elements located within the contact pad 720.

In some examples, the contactless card 700 may comprise one or more antennas 725 placed within the contactless card 700 and around the processing circuitry 755 of the contact pad 720. For example, the one or more antennas may be integral with the processing circuitry, and the one or more antennas may be used with an external booster coil. As another example, the one or more antennas may be external to the contact pad 720 and the processing circuitry.

As explained above, the contactless cards 700 may be built on a software platform operable on smart cards or other devices that comprise program code, processing capability and memory, such as JavaCard. Applets may be configured to respond to one or more requests, such as near-field data exchange (NDEF) requests, from a reader, such as a mobile Near Field Communication (NFC) reader and produce an NDEF message that comprises a cryptographically secure OTP encoded as an NDEF text tag.

Figure 8:
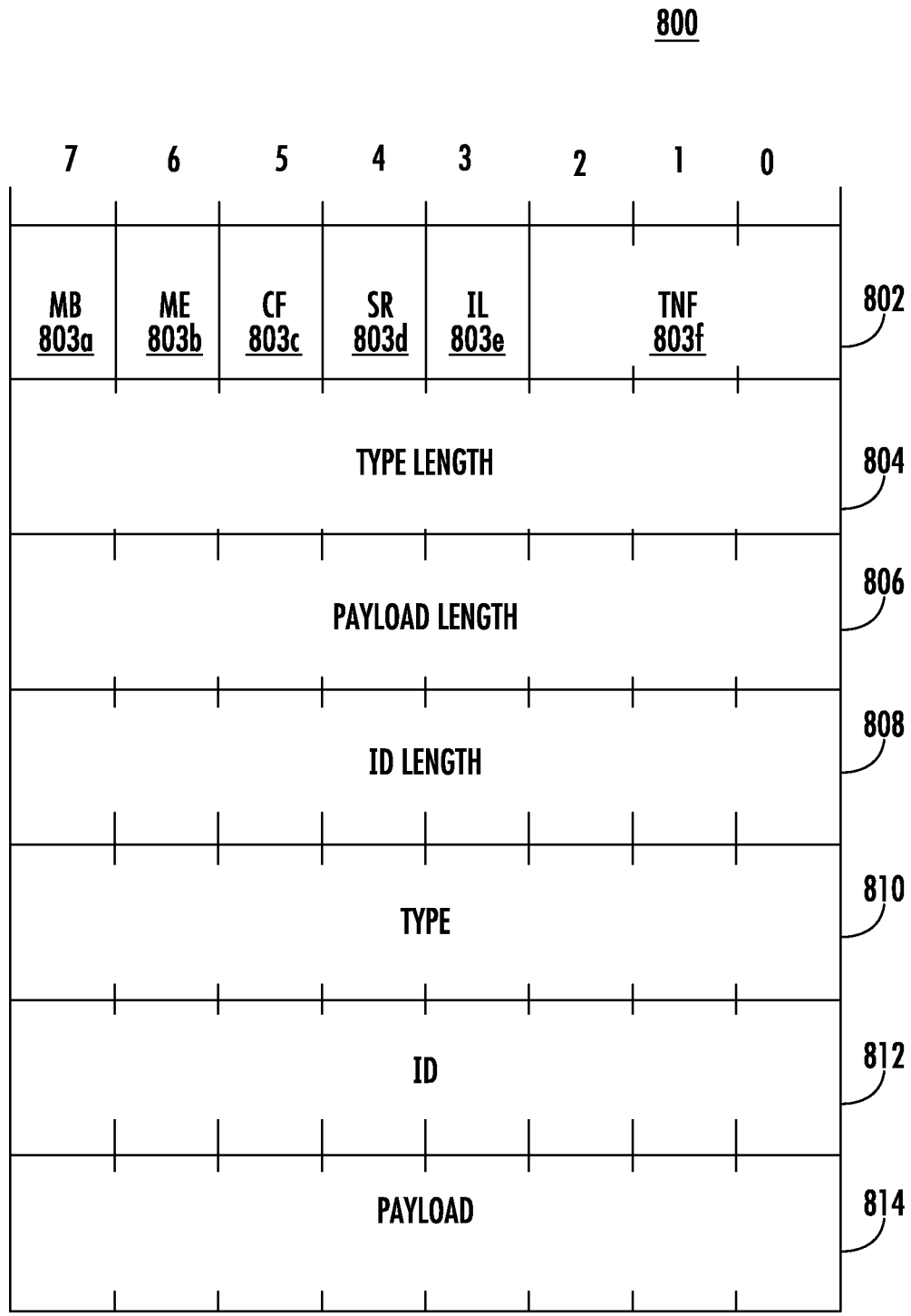
FIG. 8 illustrates exemplary fields of a cryptogram that may be used as part of a PIN exchange as disclosed in various embodiments herein.

FIG. 8 illustrates an exemplary NDEF short-record layout (SR=1) 800 according to an example embodiment. An NDEF message provides a standardized method for a transaction device to communicate with a contactless card. In some examples, NDEF messages may comprise one or more records. The NDEF record 800 includes a header 802 which includes a plurality of flags that define how to interpret the rest of the record, including a Message Begin (MB) flag 803a a Message End (ME) flag 803b, a Chunk flag (CF) 803c, a Short Record (SR) flag 803d, an ID Length (IL) flag 803e and a Type Name Format (TNF) field 803f. MB 803a and ME flag 803b may be set to indicate the respective first and last record of the message. CF 803c and IL flag 803e provide information about the record, including respectively whether the data may be 'chunked' (data spread among multiple records within a message) or whether the ID type length field 808 may be relevant. SR flag 803d may be set when the message includes only one record.

The TNF field 803f identifies the type of content that the field contains, as defined by the NFC protocol. These types include empty, well known (data defined by the Record Type Definition (RTD) of the NFC forum), Multipurpose Internet Mail Extensions (MIME) [as defined by RFC 2046], Absolute Uniform Resource Identifier (URI) [as defined by RFC 3986], external (user defined), unknown, unchanged [for chunks] and reserved.

Other fields of an NFC record include type length 804, payload length 806, ID length 808, Type 810, ID 812 and Payload 814. Type length field 804 specifies the precise kind of data found in the payload. Payload Length 806 contains the length of the payload in bytes. A record may contain up to 4,294,967,295 bytes (or 2^32−1 bytes) of data. ID Length 808 contains the length of the ID field in bytes. Type 810 identifies the type of data that the payload contains. For example, for authentication purposes, the Type 810 may indicate that the payload 814 a cryptogram formed at least in part using a Personal Identification Number (PIN) retrieved from a memory of the contactless card. ID field 812 provides the means for external applications to identify the whole payload carried within an NDEF record. Payload 814 comprises the message.

In some examples, data may initially be stored in the contactless card by implementing STORE DATA (E2) under a secure channel protocol. This data may include a personal User ID (pUID) and PIN that may be unique to the card, as well as one or more of an initial key, cryptographic processing data including session keys, data encryption keys, random numbers and other values that will be described in more detail below. In other embodiments, the pUID and PIN may be pre-loaded into the contactless card, prior to delivery of the contactless card to the client. In some embodiments, the PIN may be selected by a client associated with the contactless card and written back to the contactless card following validation of the client using various stringent authentication methods.

Figure 9:
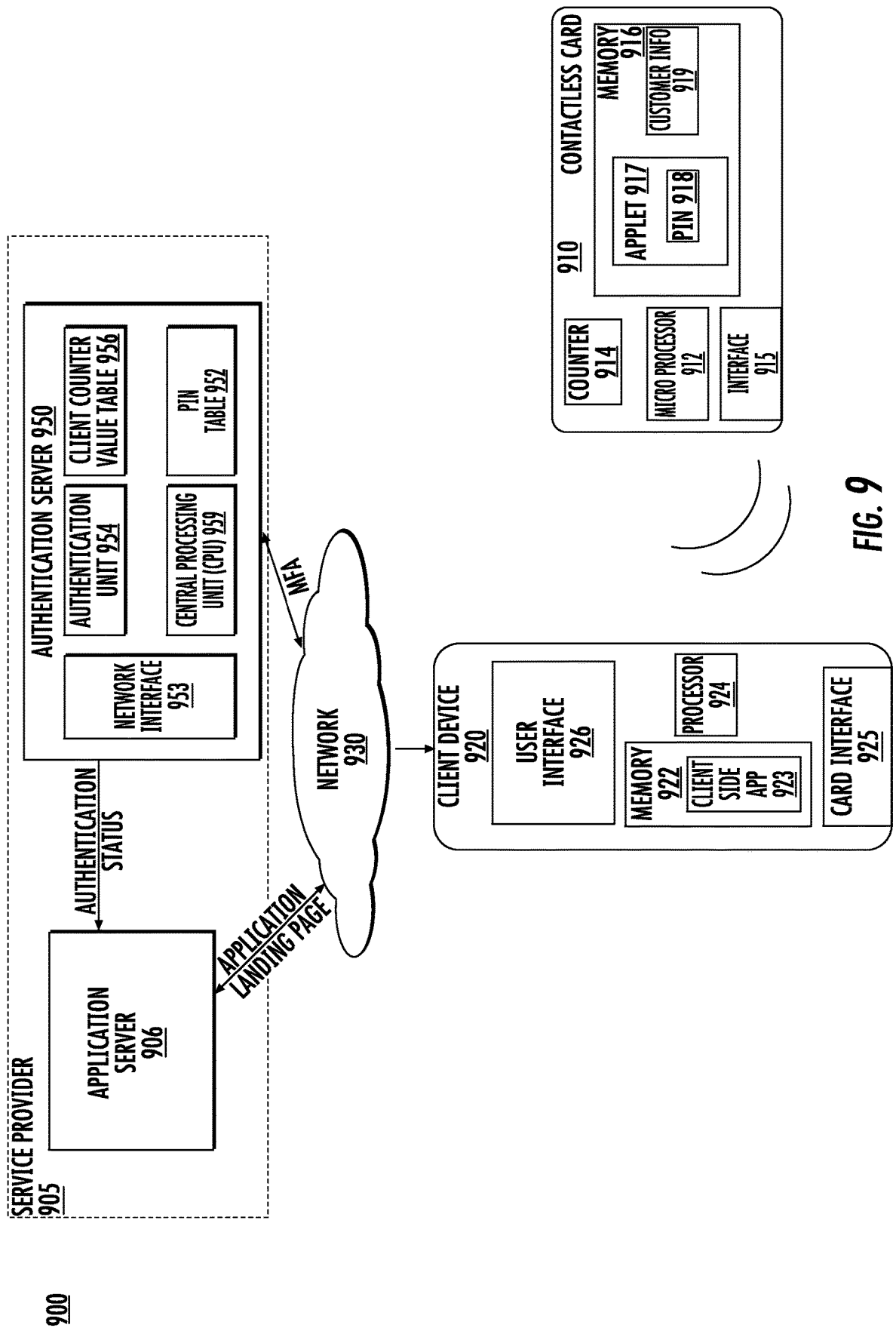
FIG. 9 is a detailed block diagram of components of a system of FIG. 1A that may be utilized to support aspects of the invention.

FIG. 9 illustrates a communication system 900 in which one of a contactless card 910 and/or an authentication server 950 may store information that may be used during first-factor authentication. As described with regard to FIG. 3, each contactless card may include a microprocessor 912 and a memory 916 for customer information 919 including one or more uniquely identifying attributes, such as identifiers, keys, random numbers and the like. In one aspect, the memory further includes an applet 917 operable when executed upon by microprocessor 912 for controlling authentication processes described herein. As described above, a PIN 918 may be stored in a memory 916 of the card 910 and accessed by the applet and/or as part of customer information 919. In addition, each card 910 may include one or more counters 914, and an interface 915. In one embodiment the interface operates NFC or other communication protocols.

Client device 920 includes a contactless card interface 925 for communicating with the contactless card and one or more other network interfaces (not shown) that permit the device 920 to communicate with a service provider using a variety of communication protocols as described above. The client device may further include a user interface 929, which may include one or more of a keyboard or touchscreen display, permitting communication between a service provider application and a user of the client device 920. Client device 920 further includes a processor 924 and a memory 922 which stores information and program code controlling operation of the client device 920 when executed upon by the processor, including for example a client-side application 923 which may be provided to the client by a service provider to facilitate access to and use of service provider applications. In one embodiment, the client-side application 923 includes program code configured to communicate authentication information including the PIN code from the contactless card 910 to one or more services provided by the service provider as described above. The client-side app 923 may be controlled via an application interface displayed on user interface 926. For example, a user may select an icon, link or other mechanism provided as part of the application interface to launch the client-side application to access application services, where part of the launch includes validating the client using a cryptogram exchange.

In an exemplary embodiment, a cryptogram exchange includes a transmitting device having a processor and memory, the memory of the transmitting device containing a master key, transmission data, and a counter value. The transmitting device communicates with a receiving device having a processor and memory, the memory of the receiving device containing the master key. The transmitting device may be configured to: generate a diversified key using the master key and one or more cryptographic algorithms and store the diversified key in the memory of the transmitting device, encrypt the counter value using one or more cryptographic algorithms and the diversified key to yield an encrypted counter value, encrypt the transmission data using one or more cryptographic algorithms and the diversified key to yield encrypted transmission data, and transmit the encrypted counter value and encrypted transmission data to the receiving device as a cryptogram. The receiving device may be configured to: generate the diversified key based on the stored master key and the stored counter value and store the diversified key in the memory of the receiving device; and decrypt the encrypted cryptogram (comprising the encrypted counter and encrypted transmission data) using one or more decryption algorithms and the diversified key. The receiving device may authenticate the transmitting device in response to a match between the decrypted counter against the stored counter. Counters may be then be incremented at each of the transmitting and receiving devices for subsequent authentications, thereby providing a cryptogram based dynamic authentication mechanism for transmitting device/receiving device transactions.

As mentioned with regard to FIG. 1A, client device 920 may be connected to various services of a service provider 905 and managed by application server 906. In the illustrated embodiment, the authentication server 950 and application server 906 are shown as separate components, although it should be appreciated that an application server may include all of the functionality described as included in the authentication server.

Authentication server 950 is shown to include a network interface 953 for communicating with network members over network 930 and a central processing unit (CPU) 959. In some embodiments, the authentication server may include non-transitory storage media for storing a PIN table 952 including PIN information related to clients of a service provider. Such information may include but is not limited to, the client username, client personal identifiers, and client keys and counters. In one embodiment the authentication server further includes an authentication unit 954 for controlling the decoding of the cryptogram and extraction of the counter, and a client counter value table 956 which may be used as described below to perform authentication in conjunction with the contactless card 910. In various embodiments, the authentication server may further comprise a PIN table 952 configured with an entry for each client/contactless card pair.

Figure 10:
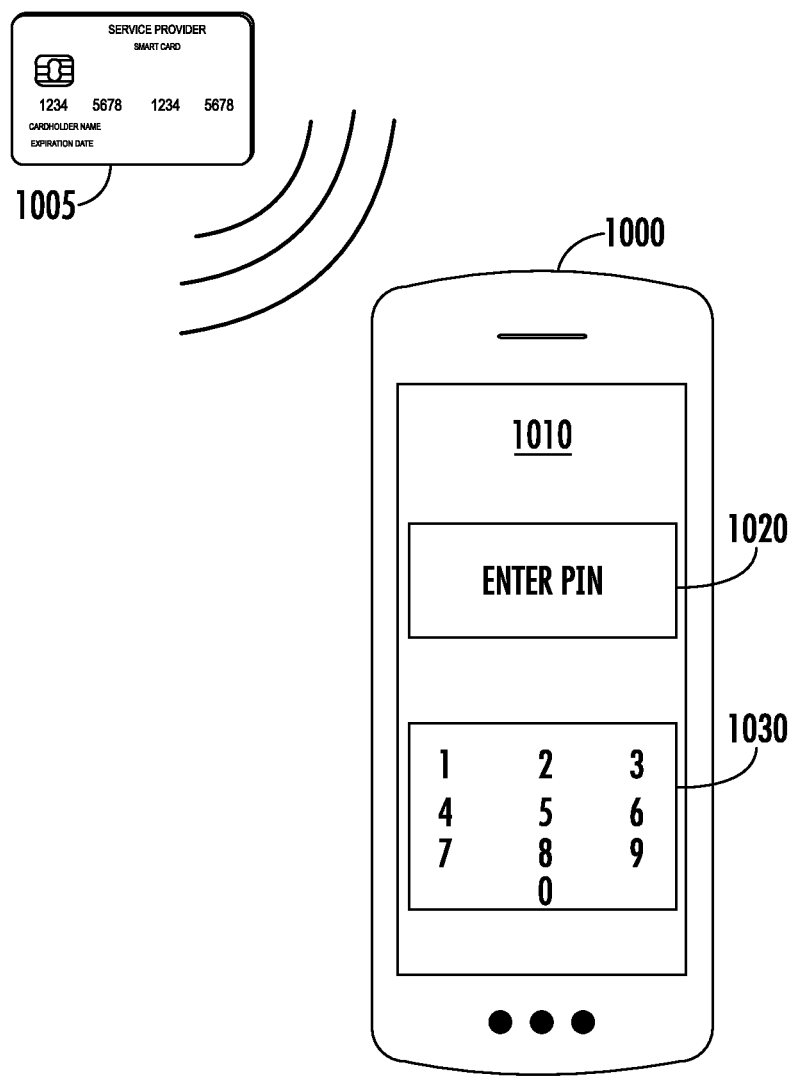
FIG. 10 depicts prompts that may be provided by a user interface of a client device according in one embodiment disclosed herein.

FIG. 10 illustrates one example of a client device 1000 comprising a display 1010 including a prompt window 1020 and an input portion 1030. The prompt portion may display various prompts to guide a client through the authentication process, for example including a prompt 'engage card' to encourage movement of the card 805 towards the device 1000. The prompt may also include an instruction such as 'enter PIN' as shown in FIG. 10 and provide a keyboard or other input mechanism to enable to user to input the PIN. In some embodiments, following successful card tap and PIN entry, a user may be permitted to complete the transaction, for example, complete a charge, gain access to sensitive data, gain access to particular people, etc.

Accordingly, a system and method for dual-factor PIN based authentication that uses a cryptogram and PIN exchange for multi-factor authentication purposes to reduce and/or eliminate the potential for card cloning has been shown and described.

As used in this application, the terms "system," "component" and "unit" are intended to refer to a computer-related entity, either hardware, a combination of hardware and software, software, or software in execution, examples of which are described herein. For example, a component may be, but is not limited to being, a process running on a processor, a processor, a hard disk drive, multiple storage drives, a non-transitory computer-readable medium (of either optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information may be implemented as signals allocated to various signal lines. In such allocations, each message may be a signal. Further embodiments, however, may alternatively employ data messages. Such data messages may be sent across various connections. Exemplary connections include parallel interfaces, serial interfaces, and bus interfaces.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving, using at least one processor, a personal identification number (PIN) associated with at least one computing device, the PIN being provided by the at least one computing device in response to a request by a contactless card to execute a transaction;
comparing, using the at least one processor, the received PIN with a stored PIN;
upon determining, using the at least one processor, a match between the stored PIN and the received PIN, and a match between an expected encrypted data generated by the at least one processor and a received encrypted data received from the contactless card, authorizing execution of the transaction, the received encrypted data is generated by the contactless card and received in response to the request for execution of the transaction, the expected encrypted data is generated using stored information associated with the contactless card; and
upon failing to determine, using the at least one processor, a match between at least one of: the received PIN and the stored PIN, and the expected encrypted data and the received encrypted data, preventing authorization of execution of the transaction.

2. The method of claim 1, wherein the receiving includes receiving, using the at least one processor, an encrypted combination of the encrypted data associated with the contactless card and the PIN;
decrypting, using the at least one processor, the encrypted combination of the encrypted data associated with the contactless card and the PIN; and
extracting, using the at least one processor, the encrypted data associated with the contactless card and the PIN.

3. The method of claim 1, wherein the stored information includes at least one of the following: a stored key, a stored counter value, a stored shared secret, and any combination thereof associated with the contactless card.

4. The method of claim 1, further comprising sending an indication of authorization of execution of the transaction or a failure to authorize execution of the transaction to the at least one computing device communicatively coupled to the at least one processor.

5. The method of claim 4, further comprising triggering execution of the transaction by the at least one computing device upon receiving the indication of authorization of the transaction.

6. The method of claim 4, wherein the at least one computing device being communicatively coupled to the contactless card.

7. The method of claim 4, wherein the at least one computing device and the contactless card are being communicatively coupled using a near-field communication (NFC) exchange, wherein the encrypted data is transmitted by the contactless card to the at least one computing device using the NFC exchange.

8. The method of claim 7, wherein the encrypted data is generated by the contactless card in response to a request to generate the encrypted data received via the NFC exchange from the at least one computing device.

9. A system, comprising:
    at least one processor; and
    at least one non-transitory storage media storing instructions, that when executed by the at least one processor, cause the at least one processor to:
        compare a personal identification number (PIN) associated with and received from at least one computing device with a stored PIN;
        upon determining a match between the stored PIN and the received PIN, and a match between an expected encrypted data generated in response to receiving the PIN associated with the at least one computing device and a received encrypted data received from a contactless card, generate a first indication authorizing execution of a transaction, the expected encrypted data is constructed using a stored information associated with the contactless card in response to a request to authorize execution of the transaction received from the contactless card; and
        upon failing to determine a match between at least one of: the expected encrypted data and the received encrypted data, and the stored PIN and the received PIN, generate a second indication preventing authorization of execution of the transaction.

10. The system of claim 9, wherein the at least one processor is configured to
    receive an encrypted combination of the encrypted data associated with the contactless card and the PIN;
    decrypt the encrypted combination of the received encrypted data and the received PIN; and
    extract the received encrypted data associated with the contactless card and the received PIN.

11. The system of claim 9, wherein the stored information includes at least one of the following: a stored key, a stored counter value, a stored shared secret, and any combination thereof associated with the contactless card.

12. The system of claim 9, wherein the at least one processor is configured to send the first indication or the second indication to the at least one computing device.

13. The system of claim 12, wherein the at least one processor is configured to trigger execution of the transaction by the at least one computing device upon receiving the first indication.

14. The system of claim 12, wherein the at least one computing device being communicatively coupled to the contactless card.

15. The system of claim 12, wherein the at least one computing device and the contactless card are being communicatively coupled using a near-field communication (NFC) exchange, wherein the encrypted data is transmitted by the contactless card to the at least one computing device using the NFC exchange.

16. The system of claim 15, wherein the encrypted data is generated by the contactless card in response to a request to generate the encrypted data received via the NFC exchange from the at least one computing device.

17. A computer program product comprising a non-transitory machine- readable medium storing instructions that, when executed by at least one programmable processor, cause the at least one programmable processor to:
    receive a personal identification number (PIN) associated with at least one computing device, and an encrypted data associated with and generated by a contactless card, the encrypted data being received in response to a request for execution of a transaction;
    construct an expected encrypted data using a stored information associated with the contactless card;
    compare the expected encrypted data and a received encrypted data associated with and generated by the contactless card, and comparing the received PIN with a stored PIN;
    upon determining a match between the stored PIN and the received PIN, and a match between the expected encrypted data and the received encrypted data, generate a first indication authorizing execution of the transaction; and
    upon failing to determine at least one of: a match between the stored PIN and the received PIN, and a match between the expected encrypted data and the received encrypted data, generate a second indication preventing authorization of execution of the transaction.

18. The computer program product of claim 17, wherein the stored information includes at least one of the following: a stored key, a stored counter value, a stored shared secret, and any combination thereof associated with the contactless card.

* * * * *